(12) United States Patent
Balliet et al.

(10) Patent No.: US 6,977,121 B2
(45) Date of Patent: Dec. 20, 2005

(54) FUEL CELL POWER PLANT HAVING A FUEL CONCENTRATION SENSOR CELL

(75) Inventors: Ryan J. Balliet, West Hartford, CT (US); Thomas D. Jarvi, Manchester, CT (US); Lars M. Pedersen, Wethersfield, CT (US); Michael L. Perry, South Glastonbury, CT (US); Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 193 days.

(21) Appl. No.: 10/406,453

(22) Filed: Apr. 3, 2003

(65) Prior Publication Data

US 2004/0197621 A1  Oct. 7, 2004

(51) Int. Cl.[7] .............................. H01M 8/04; H01M 8/00
(52) U.S. Cl. ............................ 429/22; 429/23; 429/25; 429/13; 429/12; 429/26; 429/40
(58) Field of Search .............................. 429/22, 23, 25, 429/13, 12, 26, 40

(56) References Cited

U.S. PATENT DOCUMENTS

| | | | |
|---|---|---|---|
| 5,527,632 A | 6/1996 | Gardner | |
| 6,168,705 B1 | 8/2001 | Eisman et al. | |
| 6,280,865 B1 * | 8/2001 | Eisman et al. | 429/17 |
| 6,316,135 B1 * | 11/2001 | Breault et al. | 429/22 |
| 6,455,181 B1 | 9/2002 | Hallum | |
| 2002/0076590 A1 | 6/2002 | Keegan | |

* cited by examiner

Primary Examiner—Patrick Joseph Ryan
Assistant Examiner—Angela J. Martin
(74) Attorney, Agent, or Firm—Malcolm J. Chisholm, Jr.

(57) ABSTRACT

A fuel cell power plant (10) having a fuel concentration sensor cell (54) is disclosed for detecting a concentration of fuel in a fuel cell (12) of the plant (10). A portion of a fuel exhaust stream is directed to flow through the sensor cell (54) adjacent to a membrane electrode assembly (60) of the sensor cell (54). A power circuit (62) may or may not deliver an electrical current to the cell (12), while changes in voltage across the cell (12) that are proportional to changes in hydrogen concentrations within the fuel exhaust stream are detected by a detector (68) which communicates the changes to a controller (108) for controlling a rate of fuel supply to the fuel cell (12). A porous sensor water transport plate (74) cools, humidifies delivers and removes liquid from the sensor cell (12).

12 Claims, 3 Drawing Sheets

FUEL CELL POWER PLANT HAVING A FUEL CONCENTRATION SENSOR CELL

TECHNICAL FIELD

The present invention relates to fuel cell power plants that are suited for usage in transportation vehicles, portable power plants, or as stationary power plants, and the invention especially relates to a fuel cell power plant having a sensor cell that detects a concentration of a hydrogen containing reducing fluid fuel in fuel cells of the plant.

BACKGROUND ART

Fuel cells are well known and are commonly used to produce electrical energy from hydrogen containing reducing fluid and oxygen containing oxidant reactant streams to power electrical apparatus such as motors, and transportation vehicles, etc. A fuel cell power plant may include a plurality of fuel cells arranged in a well known cell stack assembly along with various support systems, such as hydrocarbon fuel processors, thermal management systems, etc. In fuel cell power plants of the prior art, it is known that a sudden increase in an electrical load on the plant may result in an inadequate amount of hydrogen fuel within fuel cells of the plant. Failure to supply adequate hydrogen to the fuel cells of the plant results in many problems, including corrosion of common carbon support materials that support electrode catalysts. Such corrosion quickly leads to irreversible damage to fuel cells of the plant.

Known methods to maintain an adequate supply of hydrogen within an anode flow field of a fuel cell include use of a burner to combust unused hydrogen passing out of the fuel cell through a fuel exhaust. A temperature of an effluent from the burner is directly related to an amount of hydrogen within the fuel cell exhaust stream. The temperature is sensed and communicated to a controller for varying a rate of hydrogen fuel and/or air being fed into the fuel cell or a fuel processor, to thereby facilitate provision of an adequate amount of fuel to the fuel cell. For example, if the temperature of the burner effluent were to decline, a rate of hydrogen flow into the fuel cells would be increased. Burners, however, increase a cost and volume of a fuel cell power plant. It is also known to utilize a membrane electrode assembly having fuel inlet and exhaust gas streams of a fuel cell passing adjacent opposed sides of the assembly to detect a fuel concentration differential between the fuel inlet and exhaust streams, and to communicate the fuel differential to a controller to regulate a flow of fuel within the fuel inlet stream, such as disclosed in U.S. Pat. No. 6,455,181 that issued on Sep. 24, 2002. The detector in such a system is a voltmeter that detects slight variations in a voltage across the membrane electrode assembly resulting from differences in composition between the fuel inlet and exhaust stream.

Such known systems, however, rely upon measurement of a sensitive voltage differential that is subject to influence by many variables of an operating cell including a membrane electrode assembly. For example, the temperature and dew point of the fuel inlet stream will be considerably different than the temperature and dew point of the fuel exhaust stream. A result of the differential in temperatures and dew points of the fuel streams can result in condensation of water within the cell that can lead to blockage of flow channels or flooding of diffusion layers adjacent the membrane electrode assembly, all of which will negatively impact the voltage detected across the membrane electrode assembly. Additionally, a PEM electrolyte of a membrane electrolyte assembly must not be allowed to dry out if it is to provide reproducible performance of the sensor cell. Accordingly, there is a need for a fuel cell power plant having enhanced control of supplying fuel through fuel cells of the plant.

DISCLOSURE OF INVENTION

The invention is a fuel cell power plant having a fuel concentration sensor cell for detecting a concentration of fuel in a fuel cell of the plant in order to control supply of fuel to the fuel cell. The fuel cell power plant includes at least one fuel cell having a fuel inlet and a fuel exhaust for directing flow of a hydrogen containing reducing fluid fuel through the fuel cell, and a fuel concentration sensor cell for detecting a concentration of the reducing fluid fuel in the fuel cell. The sensor cell includes: an anode flow field and a cathode flow field disposed on opposed sides of a membrane electrode assembly; a power circuit for selectively delivering electrical current to opposed sides of the membrane electrode assembly; a detector secured in electrical communication with the membrane electrode assembly for detecting a voltage between opposed sides of the membrane electrode assembly; and, wherein the sensor cell is secured in fluid communication with the fuel exhaust so that a portion of the fuel exhaust stream passes through the sensor cell.

The plant also includes a porous sensor water transport plate secured in fluid communication with the sensor cell, for directing a cooling fluid which is a water stream to pass adjacent the sensor cell to remove heat and condensate water from the sensor cell and to maintain humidification of the membrane electrode assembly. A controller means is also included for controlling operation of the fuel cell, and the controller is secured in electrical communication with the detector and a fuel inlet valve so that the controller means may vary a rate of fuel passing through the fuel cell in response to the detected voltage. In various embodiments, the controller may communicate with and control fuel and/or oxygen inlet valves providing fuel and oxygen to a hydrocarbon fuel processor, such as a steam reformer, auto thermal reformer, or catalyzed partial oxidation reformer, which in turn provide the fuel to the fuel cell. Alternatively, the fuel inlet valve may be for a pure hydrogen fuel source fed directly to the fuel cell. The fuel inlet valve may also be a fuel valve means for increasing fuel to the fuel cell, including a fuel recycle blower secured on a fuel recycle line in fluid communication between the fuel exhaust and fuel inlet for increasing recycling of fuel from the fuel exhaust to the fuel inlet.

In a preferred embodiment, a portion of the fuel exhaust stream is directed to flow through the anode flow field of the sensor cell and no fluid is directed through the cathode flow field of the sensor cell while at the same time the power circuit is closed so that current is directed to the membrane electrode assembly of the sensor cell. That effectively turns the sensor cell into a hydrogen pump so that hydrogen is evolved at the cathode flow field providing a very accurate measurement of a hydrogen concentration difference between the anode and cathode flow fields of the sensor cell. The sensor cell may be calibrated prior to usage, so that at a variety of known currents and known hydrogen concentration differentials between the anode and cathode flow fields, specific voltages are identified. By calibrating the sensor cell in such a manner, changes in the voltage detected by the detector will accurately measure changes in the hydrogen concentration of the fuel cell exhaust stream so that the controller may rapidly and precisely adjust the rate of fuel supply to the fuel cell to satisfy demand for current while avoiding an inadequate supply of fuel within the fuel cell or fuel cells of the power plant.

In an alternative embodiment, a portion of the fuel exhaust stream may be directed to flow adjacent one side of the sensor cell membrane electrode assembly, such as through the cathode flow field, while a portion of a fuel inlet stream is directed to flow adjacent the opposed side of the membrane electrode assembly, such as through the anode flow field. Such an embodiment provides additional safeguards against local cathode side flow blockages should material wettability deficiencies cause channel blockage by water, and this embodiment does not require a power supply directing electrical current to the sensor cell.

In a further embodiment, the power circuit of the sensor cell may be selected to not deliver any current to the opposed sides of the sensor cell membrane electrode assembly, either by opening a power supply switch, or by simply not including a D.C. power supply, such as a battery. In such an embodiment, the sensor cell does not act as a hydrogen pump, and instead is in the form of a concentration cell measuring a differential in hydrogen concentrations between opposed sides of the sensor cell membrane electrode assembly. In that embodiment, portions of the fuel inlet and exhaust steams may be directed to flow through opposed sides of the sensor cell so that the detector may detect voltage variations based upon hydrogen concentration differences between the fuel cell inlet and exhaust streams. Alternatively, in the hydrogen concentration cell embodiment, a portion of the fuel exhaust stream may be directed to one side of the sensor cell while a portion of the fuel cell cathode inlet oxidant stream, such as air, is directed to flow through the opposed side of the sensor cell.

In another embodiment, the porous water transport plate may be in fluid communication with a sensor coolant loop that includes a pressure control valve for delivering the coolant fluid to the sensor porous water transport plate at a pressure that is less than a pressure of fluid streams passing through the anode and/or cathode flow fields of the sensor cell to facilitate removal of any condensate from the sensor cell.

Additionally, the sensor cell may be secured to be integral with a fuel cell stack assembly sharing a common coolant inlet and outlet manifold, or may be secured separately from the fuel cell or fuel cell stack assembly. Also, the sensor water transport plate may be secured adjacent to either the anode or cathode or both flow fields of the sensor cell. In an additional embodiment, to minimize any possibility of carbon corrosion of catalysts of the membrane electrode assembly of the sensor cell, the catalysts may be secured without any carbon, for example as platinum black. In a further embodiment, an electrode of the sensor cell may contain a palladium black catalyst in order to provide a more stable reference potential due to formation of a palladium hydride.

Accordingly, it is a general purpose of the present invention to provide a fuel cell power plant having a fuel concentration sensor cell that overcomes deficiencies of the prior art.

It is a more specific purpose to provide a fuel cell power plant having a fuel concentration sensor cell that can reliably, precisely and quickly detect a hydrogen fuel concentration within a fuel cell or fuel cells of the plant so that fuel supply to the fuel cell may be adjusted in response to the detected changed in fuel concentration.

These and other purposes and advantages of the present fuel cell power plant having a fuel concentration sensor cell will become more readily apparent when the following description is read in conjunction with the accompanying drawings.

DESCRIPTION OF THE PREFERRED EMBODIMENTS

Figure 1:
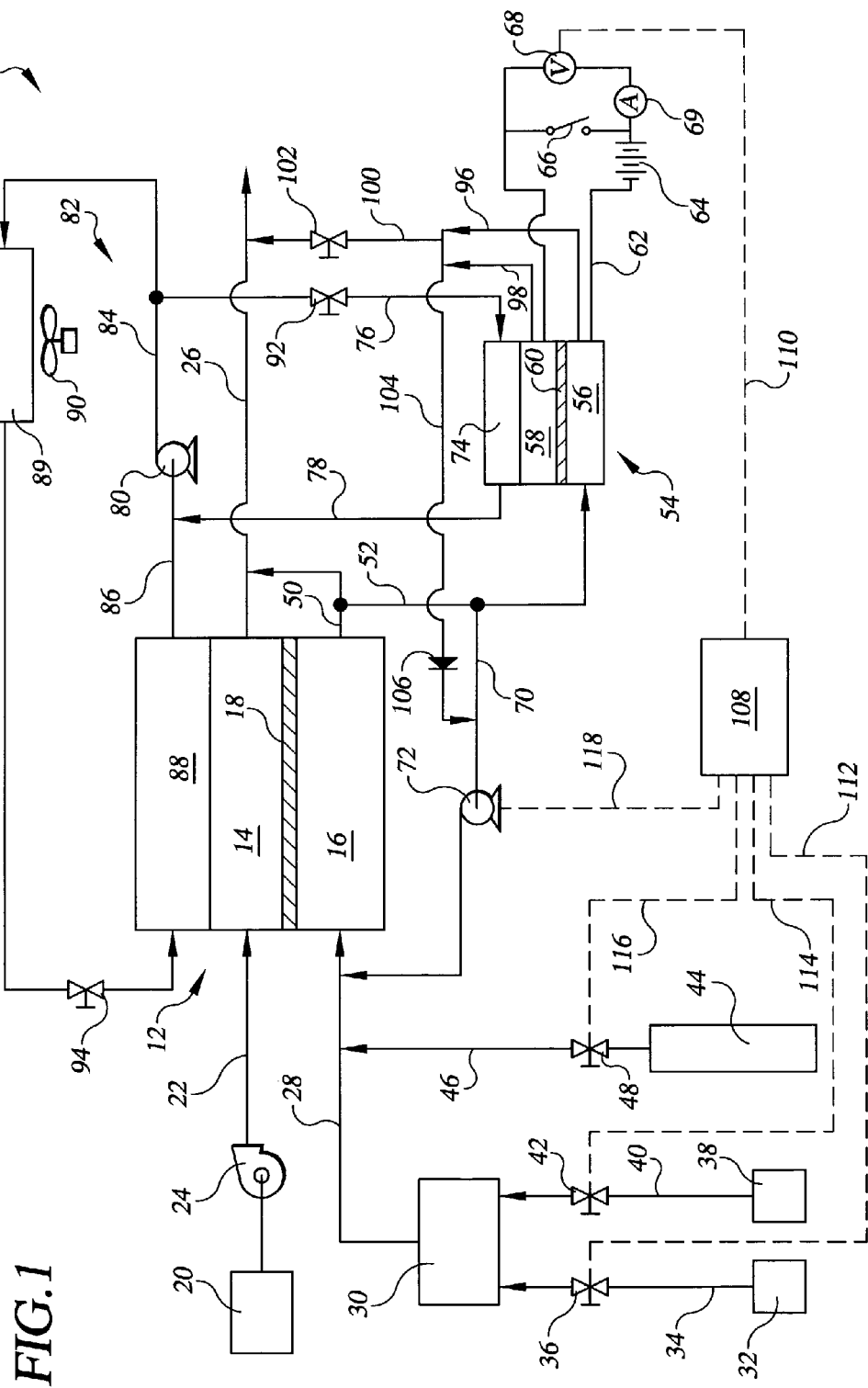
FIG. 1 is a simplified schematic representation of a fuel cell power plant having a fuel concentration sensor cell constructed in accordance with a preferred embodiment of the present invention.

Referring to the drawings in detail, a fuel cell power plant having a fuel concentration sensor cell constructed in accordance with the present invention is shown in FIG. 1, and is generally designated by the reference numeral 10. The power plant 10 includes at least one fuel cell 12 having a cathode flow field 14 and an anode flow field 16 disposed on opposed sides of a membrane electrode assembly 18 in a manner well known in the art. An oxidant source 20 supplies an oxidant such as air through an oxidant inlet 22 to the cathode flow field 14. The oxidant inlet 22 may have a blower 24 to increase the pressure of the oxidant. The oxidant passes out of the cathode flow field 14 and fuel cell 12 through an oxidant exhaust 26 to be vented out of the fuel cell 12. A hydrogen rich reducing fluid fuel is supplied to the anode flow field 16 as a fuel inlet stream passing through a fuel inlet 28. The fuel may be produced by a fuel processor of fuel processing system 30 well known in the art, such as a steam reformer, an auto thermal reformer, or a catalyzed partial oxidation reformer, etc., that receives hydrocarbon fluid from a reformer fuel source 32 through a reformer fuel inlet 34 and reformer fuel inlet valve 36. The reformer 30 also receives an oxidant from a reformer oxidant source 38 through a reformer oxidant inlet 40 and reformer oxidant inlet valve 42. The fuel processor or fuel processing system 30 typically also includes a shift reactor and selective oxidizer (not shown) as is well known in the art. Alternatively, and/or as a supplement, reducing fluid fuel may be in the form of pure hydrogen stored in a hydrogen source 44 delivered to the fuel inlet 28 through a hydrogen line 46 and hydrogen inlet valve 48. The reducing fluid fuel passes out of the anode flow field 16 and fuel cell 12 as a fuel exhaust stream through a fuel exhaust 50 that may also direct the fuel exhaust stream to pass into the oxidant exhaust 26 and out of the fuel cell 12.

Figure 2:
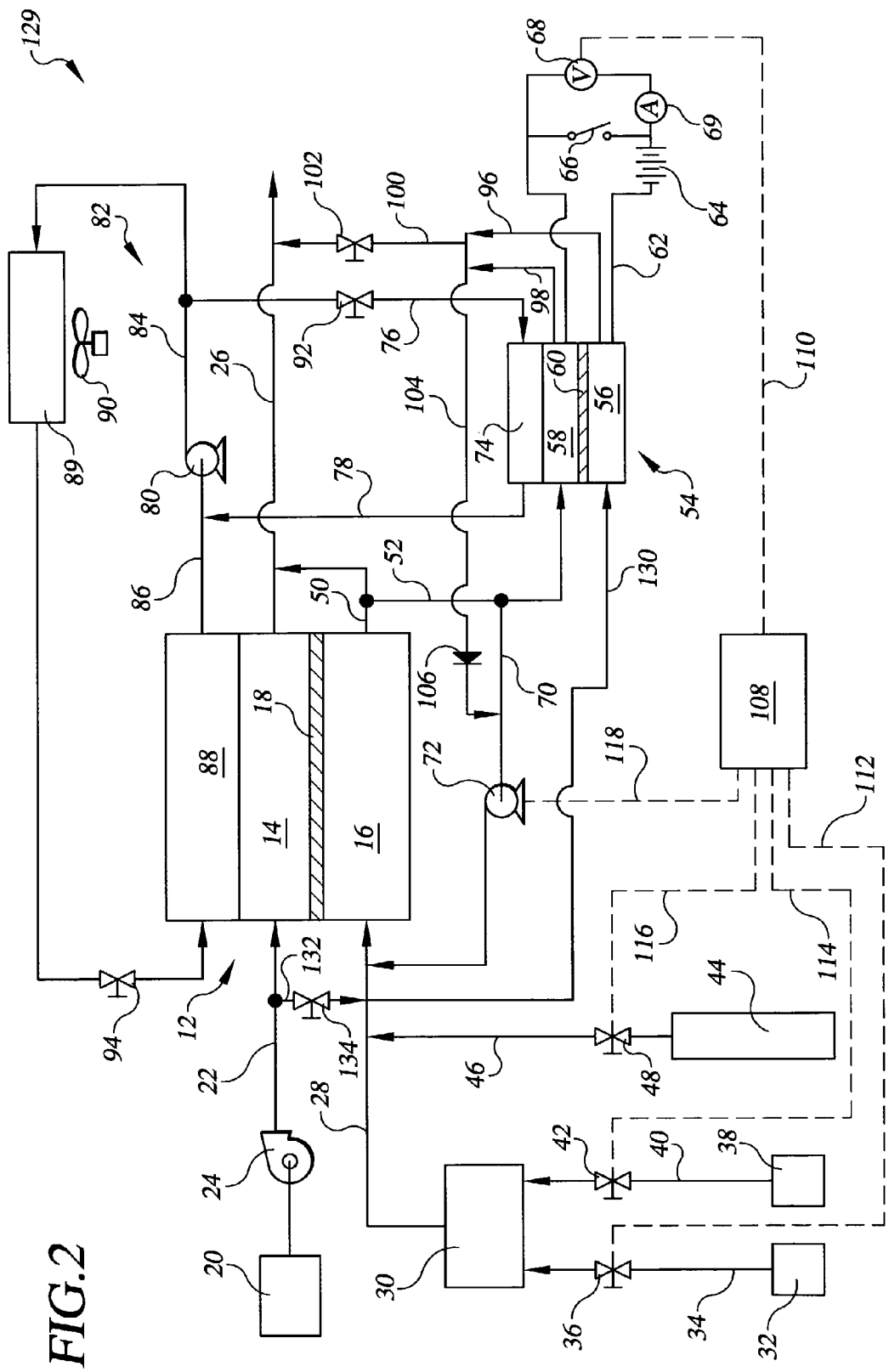
FIG. 2 is a simplified schematic representation of a fuel cell power plant having a fuel concentration sensor cell constructed in accordance with an alternative embodiment of the present invention.

The fuel exhaust 50 includes a sensor cell fuel feed line 52 that is secured in fluid communication between the fuel exhaust 50 and a fuel concentration sensor cell 54. The sensor cell includes an anode flow field 56 and a cathode flow field 58 disposed on opposed sides of a sensor cell membrane electrode assembly 60, and a power circuit 62 secured to opposed sides of the membrane electrode assembly 60 for selectively delivering an electrical current from a power source 64, such as a direct current battery known in the art, to opposed sides and through the membrane electrode assembly 60. The power circuit 62 includes a power supply switch 66 (shown in an open position in FIG. 1) so that the current from the power supply may be applied to the membrane electrode assembly 60, or so that the current may be selected to not be applied to the membrane electrode assembly 60 whenever the power supply switch 66 is open, as shown in FIGS. 1 and 2. A detector means 68 is secured in electrical communication with the membrane electrode assembly 60, such as through the power circuit 62, for detecting an electrical signal such as a voltage or amperage from the membrane electrode assembly that is related to a differential hydrogen concentration between the anode flow field 56 and cathode flow field 58, such as a voltmeter detector 68 known in the art. An amp meter 69 may also be secured to the power circuit 62. The fuel exhaust 50 is also in fluid communication with a fuel recycle line 70 having a fuel recycle blower 72. The fuel recycle line 70 is secured in fluid communication between the fuel exhaust 50 and the fuel inlet 28 so that the fuel recycle blower may selectively force a portion of the fuel exhaust stream back into the anode flow field 16.

A porous sensor water transport plate 74 is also secured in fluid communication with the fuel concentration sensor cell 54 for directing a cooling fluid, such as water, to pass adjacent to the sensor cell 54 to provide a liquid for preventing dry-out of an electrolyte of the sensor membrane electrode assembly 60, for removing heat and any water condensate from the sensor cell 54 and for humidifying the assembly 60. Additionally, the temperature of the sensor cell 54 must be controlled to result in reliable voltage measurements, and the cooling fluid passing through the sensor water transport plate 74 may be utilized to control the temperature of the sensor cell 54. The cooling fluid is directed into the sensor water transport plate 74 through a sensor coolant feed line 76 and out of the plate 74 through a sensor coolant discharge line 78, and the feed 76 and discharge lines 78, may be secured in fluid communication with, and on opposed sides of, a coolant pump 80 of a primary coolant loop 82. The sensor coolant feed line is secured in fluid communication with a primary coolant feed line 84 secured to the discharge side of the coolant pump 80, and the sensor coolant discharge line 78 is secured to a primary coolant discharge line 86 secured in fluid communication between a fuel cell water transport plate 88 and the suction side of the coolant pump 80. The primary coolant loop 82 also includes a coolant radiator 89 and associated fan 90 secured to the primary coolant feed line 84 in a manner well known in the art. The fuel cell water transport plate 88 is secured adjacent to the cathode flow field 14, also in a manner well known in the art.

A sensor coolant pressure control means for maintaining a positive pressure differential between the fluid stream or streams passing through the sensor cell 54 and the cooling fluid passing through the sensor water transport plate 74 is included. The sensor pressure control means may include a sensor coolant pressure control valve 92 coordinated with the coolant pump 80 and a sensed pressure of fluid passing through the sensor cell in a manner known in the art, such as disclosed in U.S. Pat. No. 6,316,135 that issued on Nov. 13, 2001, and is owned by the assignee of all rights in the present invention. The coolant loop may also include a primary coolant pressure control means for maintaining a positive pressure differential between the oxidant stream passing through the cathode flow field 14 and the cooling fluid passing through the adjacent fuel cell water transport plate 88, such as a primary coolant pressure control valve 94, as is known in the art and disclosed in the aforesaid U.S. Pat. No. 6,316,135. It is also pointed out that the fuel cell membrane electrode assembly 18 and sensor cell membrane electrode assembly 60, coolant loop and other fuel cell components described herein may be manufactured in a manner consistent with similar components known in the art, such as disclosed in the aforesaid U.S. Pat. No. 6,316,135.

The fuel concentration sensor cell 54 also includes a sensor anode exhaust 96 and a sensor cathode exhaust 98 that merge into a sensor exhaust 100 having a sensor exhaust valve 102 that may direct fluid streams leaving the sensor cell 54 into the oxidant or plant exhaust 26. The sensor exhaust valve 102 may be controlled instead to direct all or portion of the fluid streams leaving the sensor cell 54 through a sensor recycle line 104 and a one-way or check valve 106 secured to the sensor recycle line 104 and into the fuel recycle line 70 as shown in FIGS. 1 and 2. The check valve 106 makes sure any hydrogen fuel generated by the sensor cell 54 is not drawn from the sensor recycle line 104 back into the fuel exhaust 50 or sensor fuel feed line 52.

The detector 68 is secured in electrical communication with a controller means 108 through electrical line 110, which may comprise any wire or wireless mechanism known in the art capable of communicating detected electrical signals. The controller means 108 may be any controller known in the art, such as a micro processor, computer, etc., capable of controlling fuel cell operating controls, such as valves, blowers, etc., in response to sensed information. The controller is secured in communication through any known means (e.g., electrical, pneumatic, hydraulic, mechanical) with a fuel inlet valve means for controlling a rate of supply of the reducing fluid fuel to the fuel inlet 28. The fuel inlet valve means may include the reformer fuel inlet valve 36, that is in communication with the controller 108 through line 112; the reformer oxidant inlet valve 42, that is in communication with the controller 108 through line 114; the hydrogen fuel inlet valve 48, that is in communication with the controller 108 through line 116; and the fuel recycle blower 72, that is in communication with the controller 108 through line 118; or combinations thereof.

As shown in FIG. 1, in a preferred embodiment, the sensor fuel feed line 52 may direct a portion of the fuel cell exhaust stream to flow into the anode flow field 56 of the fuel concentration sensor cell 54 while the power supply switch 66 is closed (the switch being shown open in FIG. 1) to direct current to the sensor cell membrane electrode assembly 60. In this embodiment, the sensor cell 54 effectively becomes a hydrogen pump, so that hydrogen is evolved within the cathode flow field 58 of the sensor cell 54. If the fuel cell power plant 10 was operating at a very high fuel utilization rate on relatively dilute fuel, this preferred embodiment facilitates rapid and precise measurement of changes in hydrogen concentrations within the fuel exhaust stream. The detector 68 may be a voltmeter to measure changes in voltage across the sensor cell membrane electrode assembly 60 as a function a hydrogen concentration within the fuel exhaust stream, while the power supply delivers a constant current. Alternatively, a constant voltage may be applied to the membrane electrode assembly 60, while the detector 68 measures changes in current as a function of changing hydrogen concentrations within the fuel exhaust stream.

By utilizing this preferred embodiment wherein the sensor cell 54 becomes a hydrogen pump evolving essentially pure hydrogen, an additional major advantage is achieved. The pure hydrogen improves accuracy of detection of the hydrogen concentration changes in the fuel exhaust stream because the sensor cell 54 would be calibrated with pure hydrogen. An additional advantage is that the portion of the fuel exhaust stream entering the sensor cell 54 will have a lower carbon monoxide content than the fuel stream entering the fuel cell 12 because of oxidation of the carbon monoxide within the fuel cell. This lower carbon monoxide level will have a reduced tendency to poison catalysts of the sensor cell membrane electrode assembly 60. Additionally, in an alternative embodiment, the sensor cell membrane electrode assembly 60 may include at least one of the electrodes of the membrane electrode assembly being made of platinum black having no carbon support to avoid mixed potentials associated with carbon-supported electrocatalysts, as well as to minimize the impact of any periodic fuel starvation on the membrane electrode assembly 60 of the sensor cell 54. In another embodiment, at least one of the electrodes of the membrane electrode assembly 60 may be contain a palladium black catalyst. Such a palladium black catalyst provides a more stable reference potential because of formation of a palladium hydride.

The changes in the hydrogen concentration of the fuel exhaust stream passing through the sensor cell 54 detected by the detector 68 are communicated to the controller means which in response controls the fuel inlet valve means to make sure the fuel cell 12 receives an adequate amount of fuel. A further beneficial efficiency of this preferred embodiment is that the pure hydrogen generated by the sensor cell 54 may be directed through the sensor anode exhaust 96, and the sensor recycle line 104 back into the anode flow field 16 of the fuel cell 12.

Figure 3:
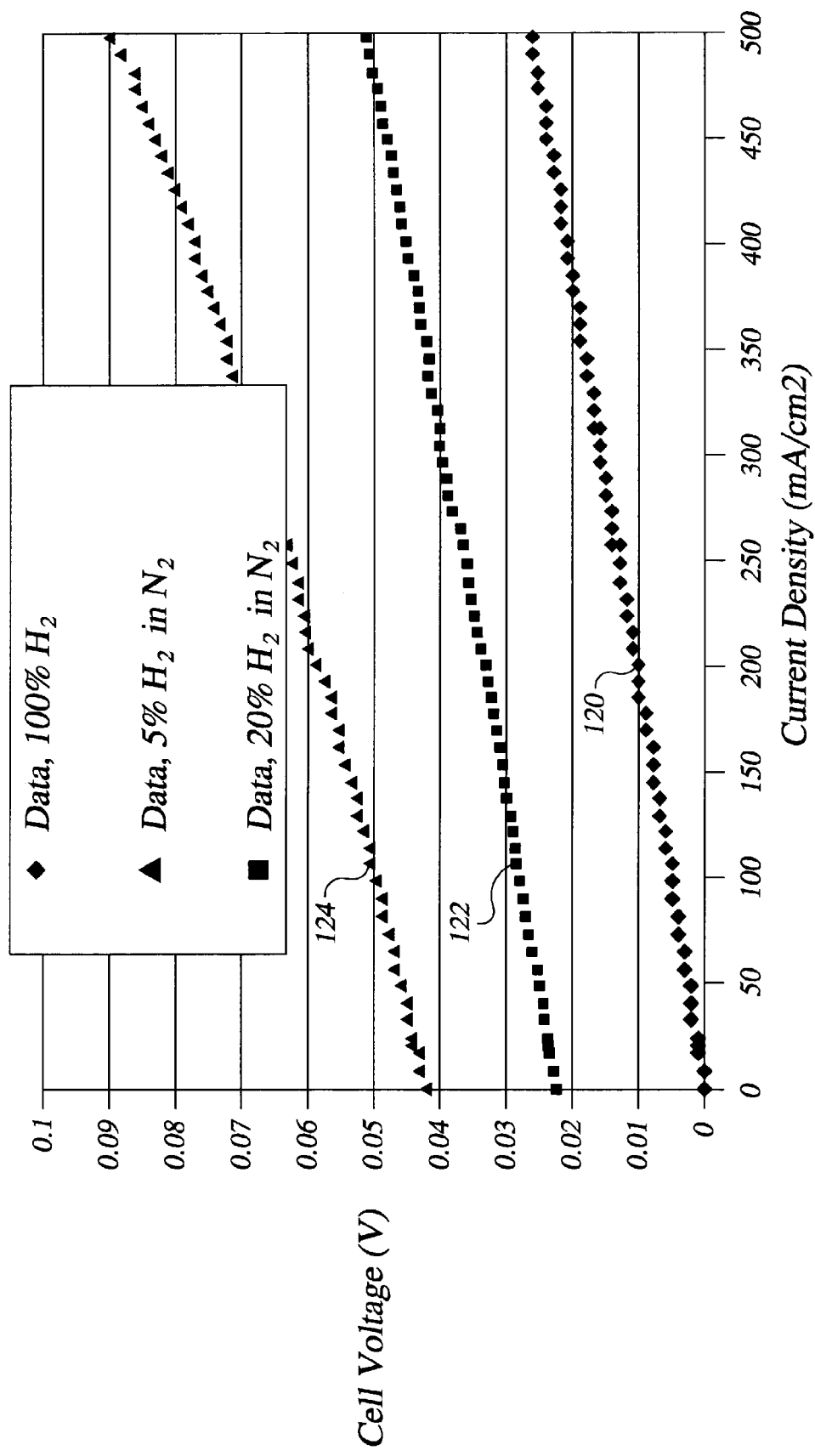
FIG. 3 is a graph showing a plot of cell voltages of a sensor cell of the present invention at varying current densities for three different hydrogen concentrations and for two predictions according to a Nernst Equation

The sensor cell 54 may be calibrated by passing a known concentration of hydrogen through the sensor cell 54 while a specific current is applied across the membrane electrode assembly 60. Resulting changes in the voltage of the sensor cell 54 are then measured. For example, and as shown in FIG. 3, changes in cell voltage are plotted in line 120 for a concentration of 100% hydrogen; in line 122 for a concentration of 20% hydrogen in air ("$N_2$"); and, in line 124 for 5% hydrogen in air.

By such a calibration of the sensor cell 54 for known hydrogen concentrations, one skilled in the art would be able to accurately measure an actual hydrogen concentration of the fuel exhaust stream passing through the sensor cell 54 based upon voltage changes if a steady current is applied, or based upon current changes if a steady voltage is applied.

As shown in FIG. 2, in an alternative embodiment 129, the sensor fuel feed line 52 directs a portion of the fuel exhaust stream into one side of the sensor cell 54, such as the cathode flow field 58 of the sensor cell 54, while a portion of a fuel inlet stream is directed from the fuel inlet 28 through a second sensor fuel feed line 130 to an opposed side of the sensor cell 54, such as the anode flow field 56 of the sensor cell 54. By application of current from the power supply 64 to the sensor cell 54 membrane electrode assembly 60, hydrogen is evolved within the cathode flow field 58 of the sensor cell 54, and changes in the voltage across the membrane electrode assembly 60 are proportional to a concentration difference between hydrogen within the fuel inlet and exhaust streams entering and leaving the fuel cell 12. The detector 68 can then be utilized to communicate to the controller means 108 changes in fuel concentration by the fuel cell to ensure provision of adequate fuel to the fuel cell 12. Additionally, an oxidant feed line 132 may pass through an oxidant feed valve 134 and into the fuel inlet 28 and into the second sensor feed line 130 to supplement the fuel inlet stream passing into the sensor cell 54. It is known that injecting a small concentration of oxygen into the fuel will result in oxidation of a significant quantity of carbon monoxide in the fuel stream. Reducing carbon monoxide in the fuel stream being directed into the sensor cell will result in more reliable operation of the sensor cell 54.

With either the FIG. 1 or FIG. 2 embodiment, the power supply switch 66 may be closed as described above effectively turning the sensor cell 54 into a "hydrogen pump", or the power supply switch may open, as shown in FIGS. 1 and 2 so that the sensor cell 54 is operated as a "hydrogen concentration cell." In the hydrogen concentration cell embodiment, the power plant 10 may be operated as shown in FIG. 2, so that a portion of the fuel inlet stream flows through one side of the sensor cell while a portion of the fuel cell exhaust stream passes through an opposed side of the sensor cell. Alternatively, in the hydrogen concentration cell embodiment, the power plant 10 may be controlled as shown in FIG. 1 so that a portion of the fuel cell exhaust stream passes through one side of the sensor cell 54, such as through the anode side as shown in FIG. 1, while the oxidant passing through the fuel cell 12 cathode flow field 14, such as air, is directed to flow through the opposed side of the sensor cell, such as through the sensor cell 54 cathode flow field 58. The hydrogen concentration cell embodiment may have no power source 64, or simply have a power supply switch open, as shown in FIGS. 1 and 2. When a power source 64 is not available, accuracy is less sensitive to gas blockage, and with oxygen always available, diffusion through the membrane electrode assembly 60 may result in less carbon monoxide on an anode catalyst of the membrane electrode assembly 60.

Although the sensor cell 54 is shown in FIGS. 1 and 2 as being separate from the fuel cell 12, the present invention also includes the fuel cell being integral with the fuel cell 12 to share common coolant inlet and outlet manifolds (not shown), wherein both the sensor cell 54 and fuel cell 12 are also integral with a plurality of fuel cells in a well-known fuel cell stack assembly. The sensor cell 54 may also be utilized with a plurality of sensor cells and fuel cells within a fuel cell stack assembly. Additionally, the porous sensor water transport plate 74 or cooler plate may be secured adjacent the cathode flow field 58 of the sensor cell 54 as shown in FIGS. 1 and 2, or the plate 74 may be secured adjacent the anode flow field 56 of the sensor cell, or an additional sensor water transport plate (not shown) may be secured adjacent the sensor cell anode flow field 54 to enhance management of sensor cell 54 water management.

The U.S. Patents referred to above are hereby incorporated herein by reference.

While the present invention has been disclosed with respect to the described and illustrated embodiments, it is to be understood that the invention is not to be limited to those embodiments. For example, the fuel cell 12 may include a membrane electrode assembly 18 utilizing a proton exchange membrane ("PEM"), or the fuel cell 12 may employ alternative electrolytes known in the art. The sensor cell membrane electrode assembly 60 may be constructed as a PEM electrolyte having catalysts secured to opposed sides by support and/or diffusion layers, as known in the art. The electrolyte described in FIGS. 1 and 2 may also be an aqueous acid or base if the cooling fluid is water. Alternatively, the sensor cell 54 may contain a molten salt electrolyte or a solid oxide electrolyte if the water cooling fluid is eliminated from the sensor cell 54 and the sensor cell is reactant cooled in a manner known in the art. Accordingly, reference should be made primarily to the following claims rather than the foregoing description to determine the scope of the invention.

What is claimed is:

1. A fuel cell power plant (10) for generating electrical current, the plant comprising:
   a. at least one fuel cell (12) having a fuel inlet (28) and a fuel exhaust (50) for directing flow of a hydrogen containing reducing fluid fuel into and out of the fuel cell (12);
   b. a fuel concentration sensor cell (54) for detecting concentration of the reducing fluid fuel in the fuel cell (12), the sensor cell (54) including;
      i. an anode flow field (56) and a cathode flow field (58) disposed on opposed sides of a membrane electrode assembly (60);
      ii. a power circuit (62) for selectively delivering electrical current through the membrane electrode assembly (60);
      iii. a detector (68) secured in electrical communication with the membrane electrode assembly (60) for detecting an electrical signal between opposed sides of the membrane electrode assembly (60); and,
      iv. wherein the sensor cell (54) is secured in fluid communication with the fuel exhaust (50) so that a portion of a fuel exhaust stream passes through the sensor cell (54);
   c. a porous sensor water transport plate (74) secured in fluid communication with the sensor cell (54) for directing a cooling fluid to pass adjacent the sensor cell (54) to remove heat and condensate water from the sensor cell (54) to maintain humidity of the membrane electrode assembly (60); and,
   d. a controller means (108) for controlling operation of the fuel cell (12) secured in electrical communication with the detector (68) and in communication with a fuel inlet valve means for controlling a rate of supply of the reducing fluid fuel to the fuel cell (12) in response to communication from the detector (68).

2. The fuel cell power plant (10) of claim 1, wherein a sensor fuel feed line (52) directs the portion of the fuel exhaust stream to flow only through the anode flow field (56) of the sensor cell (54), and a power supply switch (66) of the power circuit (62) is closed to direct an electrical current through the membrane electrode assembly (60).

3. The fuel cell power plant (10) of claim 1, wherein a sensor fuel feed line (52) directs the portion of the fuel exhaust stream to flow through one side of the sensor cell (54), a second sensor feed line (130) directs a portion of a fuel inlet stream to flow through an opposed side of the sensor cell (54), and a power supply switch (66) of the power circuit (62) is closed to direct an electrical current through the membrane electrode assembly (60).

4. The fuel cell power plant (10) of claim 1, wherein, the membrane electrode assembly (60) of the sensor cell (54) includes catalysts without any carbon support materials secured to at least one side of the membrane electrode assembly (60).

5. The fuel cell power plant (10) of claim 1, wherein, the membrane electrode assembly (60) of the sensor cell (54) includes a palladium black catalyst secured to at least one side of the membrane electrode assembly (60).

6. The fuel cell power plant (10) of claim 1, wherein the porous sensor water transport plate (74) is secured in fluid communication with a sensor coolant pressure control means (92) for maintaining a positive pressure differential between any fluid streams passing trough the sensor cell (54) and the cooling fluid passing through the sensor water transport plate (74).

7. The fuel cell power plant (10) of claim 1, wherein the fuel inlet valve means includes a hydrocarbon fuel processing reformer fuel inlet valve (36), a reformer oxidant inlet valve (42), a hydrogen fuel inlet valve (48), a fuel recycle blower (72) secured to a fuel recycle line (70), or combinations thereof, all of which are secured in fluid communication with the fuel inlet.

8. A fuel cell power plant (10) for generating electrical current, the plant comprising;
   a. at least one fuel cell (12) having a fuel inlet (28) and a fuel exhaust (50) for directing flow of a hydrogen containing reducing fluid fuel into and out of the fuel cell (12);
   b. a fuel concentration sensor cell (54) for detecting a concentration of the reducing fluid fuel in the fuel cell (12), the sensor cell (54) including;
      i. an anode flow field (56) and a cathode flow field (58) disposed on opposed sides of a membrane electrode assembly (60);
      ii. a detector (68) secured in electrical communication with the membrane electrode assembly (60) for detecting an electrical signal between opposed sides of the membrane electrode assembly (60); and,
      iii. wherein the sensor cell (54) is secured in fluid communication with the fuel exhaust (50) so that a portion of a fuel exhaust stream passes through the sensor cell (54);
   c. a porous sensor water transport plate (74) secured in fluid communication with the sensor cell (54) for directing a cooling fluid to pass adjacent the sensor cell (54) to remove heat and condensate water from the sensor cell (54) and to maintain humidity of the membrane electrode assembly (60); and,
   d. a controller means (108) for controlling operation of the fuel cell (12) secured in electrical communication with the detector (68) and in communication with a fuel inlet valve means for controlling a rate of supply of the reducing fluid fuel to the fuel cell (12) in response to communication from the detector (68).

9. The fuel cell power plant (10) of claim 8, wherein a sensor fuel feed line (52) directs the portion of the fuel exhaust stream to flow only through one side of the sensor cell (54), and an oxidant supplied to the fuel cell (12) is directed to flow through an opposed side of the fuel cell (12).

10. The fuel cell power plant (10) of claim 8, wherein a sensor fuel feed line (52) directs the portion of the fuel exhaust stream to flow to one side of the sensor cell (54), and a second sensor feed line (130) directs a portion of a fuel inlet stream to flow through an opposed side of the sensor cell (54).

11. The fuel cell power plant (10) of claim 8, wherein, the membrane electrode assembly (60) of the sensor cell (54) includes catalysts without any carbon support materials secured to at least one side of the membrane electrode assembly (60).

12. The fuel cell power plant (10) of claim 8, wherein, the membrane electrode assembly (60) of the sensor cell (54) includes a palladium black catalyst secured to at least one side of the membrane electrode assembly (60).

* * * * *